(12) United States Patent
Baumgartner et al.

(10) Patent No.: US 8,733,511 B2
(45) Date of Patent: May 27, 2014

(54) MULTI-DISC BRAKE

(75) Inventors: Johann Baumgartner, Moosburg (DE); Aleksandar Pericevic, Munich (DE)

(73) Assignee: KNORR-BREMSE Systeme fuer Nutzfaurzeuge GmbH, Munich (DE)

( * ) Notice: Subject to any disclaimer, the term of this patent is extended or adjusted under 35 U.S.C. 154(b) by 257 days.

(21) Appl. No.: 13/277,724

(22) Filed: Oct. 20, 2011

(65) Prior Publication Data

US 2012/0073911 A1  Mar. 29, 2012

Related U.S. Application Data

(63) Continuation of application No. PCT/EP2010/002340, filed on Apr. 16, 2010.

(30) Foreign Application Priority Data

Apr. 21, 2009 (DE) .................. 10 2009 018 226

(51) Int. Cl.
*F16D 25/0638* (2006.01)

(52) U.S. Cl.
USPC ............... 188/71.5; 192/70.28; 192/85.4

(58) Field of Classification Search
USPC ......... 188/71.5, 72.6–72.8; 192/70.28, 223.3, 192/70.251, 70.252, 70.27, 85.39, 85.4, 192/85.41, 85.42
See application file for complete search history.

(56) References Cited

U.S. PATENT DOCUMENTS

| | | | |
|---|---|---|---|
| 3,537,556 A | 11/1970 | Pfeffer et al. | |
| 3,862,678 A * | 1/1975 | Collins | 192/85.09 |
| 4,640,400 A * | 2/1987 | Nakane et al. | 192/70.252 |
| 5,228,543 A * | 7/1993 | Heidenreich | 188/72.4 |
| 5,253,737 A | 10/1993 | Klaue | |
| 5,383,544 A * | 1/1995 | Patel | 192/70.28 |
| 6,374,956 B1 | 4/2002 | Nacumann et al. | |
| 6,508,336 B1 | 1/2003 | El-Kassouf | |
| 6,543,596 B2 * | 4/2003 | Martin et al. | 192/85.4 |
| 7,258,208 B1 | 8/2007 | Dennis et al. | |
| 2012/0037463 A1* | 2/2012 | Baumgartner et al. | 188/71.5 |

FOREIGN PATENT DOCUMENTS

| | | |
|---|---|---|
| DE | 850 844 | 9/1952 |
| DE | 39 35 114 A1 | 5/1990 |
| EP | 1 013 957 A2 | 6/2000 |

OTHER PUBLICATIONS

International Search Report dated Jun. 30, 2010 with English translation (four (4) pages).
German Office Action dated Feb. 3, 2010 with English translation (fourteen (14) pages).
International Preliminary Report on Patentability dated Nov. 10, 2012 (Seven (7) pages).

* cited by examiner

*Primary Examiner* — Christopher Schwartz
(74) *Attorney, Agent, or Firm* — Crowell & Moring LLP

(57) ABSTRACT

A multi-disc brake, in particular for a road vehicle, includes parallel plates which are arranged at a distance from one another and which are rotationally stable and between which a rotatable brake disc is positioned. The radially extending plates and the brake discs can be pressed against one another during braking while overcoming a clearance and once the brake is released, the discs are separated from each other thus forming a clearance. The brake discs are pressed individually in the non-brake position by axially working restoring springs and/or in groups counter to an axially stationary stop, which stop can be rotated with the brake discs.

14 Claims, 1 Drawing Sheet

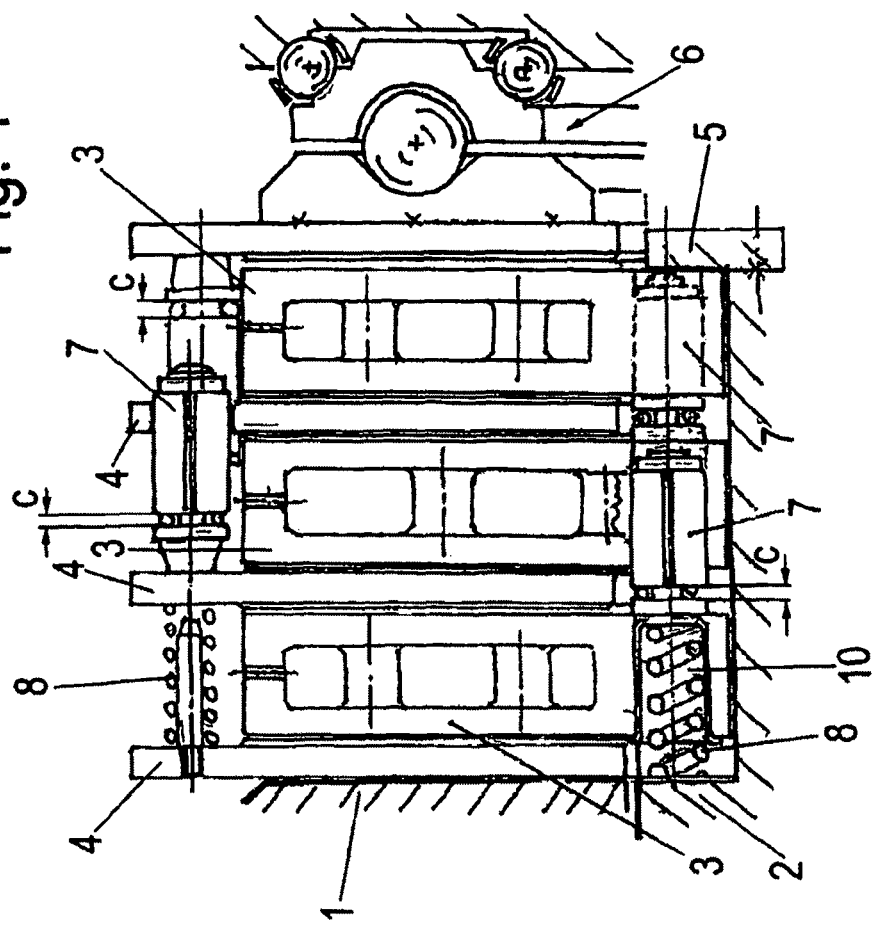
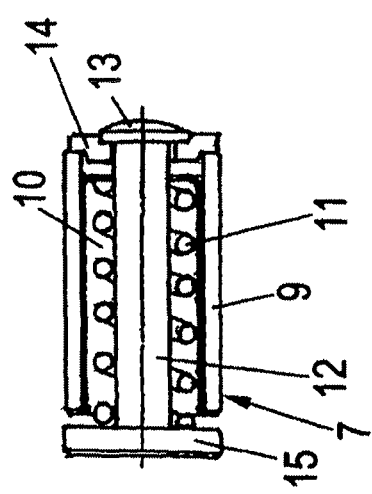

MULTI-DISC BRAKE

CROSS-REFERENCE TO RELATED APPLICATIONS

This application is a continuation of PCT International Application No. PCT/EP2010/002340, filed Apr. 16, 2010, which claims priority under 35 U.S.C. §119 from German Patent Application No. DE 10 2009 018 226.8, filed Apr. 21, 2009, the entire disclosures of which are herein expressly incorporated by reference.

BACKGROUND AND SUMMARY OF THE INVENTION

The invention relates to a multi-disc brake, in particular for a commercial road vehicle.

Multi-disc brakes are used both as dry and wet brakes, in particular in slow-moving, heavy agricultural and construction machinery. In commercial road vehicles, such as heavy goods vehicles or buses, such multi-disc brakes have not yet come into use, although they have considerable advantages over presently used disc brakes. In particular, they have very low wear and operate at a lower temperature level.

Standing in the way of their use in the field of road vehicles are the high residual drag moments of this brake construction as well as rattling noises produced by the brake discs mounted floatingly in toothed or stud guides. This floating mounting also in some cases entails very high wear of the guide parts.

Both the residual drag moments and the rattling noises are the result of wobbling movements, especially of the rotating brake discs, which occur during driving operations.

The cause of these wobbling movements lies essentially in the fact that the concerned rotating brake discs represent a gyroscopic system which reacts with compensating movements to forces acting from outside, accelerations and position changes. These compensating movements, also known as precession and nutation, lead to partial abutment of the rotating brake discs against the plates retained non-rotatably, producing undesired and uneven wear both on the brake discs and on the plates. In addition, the sliding guide system of the rotating discs is subjected to considerable wear.

It is therefore the object of the invention to develop a multi-disc brake of the above-mentioned type such that its applicability is improved and that, in particular, it can be utilized in fast-moving road vehicles with an economically justifiable service life.

This object is achieved by a multi-disc brake, in particular for a road vehicle, comprising plates arranged non-rotatably parallel to and spaced apart from one another, between each of which a respective rotatable brake disc is positioned. The radially extending plates and the brake discs are able to be pressed against one another while overcoming a clearance during braking and to separate from one another while forming a clearance upon release of the brake. In the unbraked position, the brake discs are pressed individually and/or as a block by axially acting return springs against an axially fixed stop, which is rotatable with the brake discs.

In accordance with the invention, each of the rotating brake discs is held in a stop-limited position in a non-actuated state of the brake.

The wobbling movements described with reference to the state of the art and the high wear resulting therefrom are therefore effectively prevented, as also are rattling noises.

The wobbling movements mentioned are also prevented at relatively high rotational speeds of the brake discs, so that the novel multi-disc brake can be used non-problematically in fast-moving road vehicles, in particular commercial road vehicles such as heavy goods vehicles or buses. The fundamental advantages of a multi-disc brake can therefore be exploited in this field also.

According to an advantageous development of the invention, there is provided a stop against which the brake disc on the actuation side rests in the unbraked position, in which brake disc at least one pressure element is arranged with defined axial displaceability. The pressure element forms for the neighboring brake disc a stop adapted to the state of wear. The pressure element therefore serves to compensate increased clearance caused by wear.

This neighboring brake disc may also be fitted with pressure elements against which the respective following brake disc rests.

In this case, the pressure elements are retained by frictional engagement and, upon application of the associated brake disc, form a force threshold which is higher than the jolting and wobbling forces acting during driving operation. However, upon actuation of the brake this force threshold is overcome and the clearance is reduced until frictional contact is attained.

For example, in the case of increased clearance caused by wear, the pressure element is displaced by the increasing application force so far into the press-fit seating in the brake disc that a sufficiently high braking effect is achieved.

The pretensioning of the whole disc block consisting of the rotating brake discs and the non-rotating plates is achieved according to the invention by use of one or more return springs which bear against the last brake disc oriented away from the stop with a force in the direction of the stop. The individual brake discs of the block are tensioned by way of their pressure elements and rest jointly with sufficient force against the stop via the first brake disc oriented towards the stop.

The stop is rigidly connected to a wheel hub to which the brake discs are fastened non-rotatably. In this case, the stop may be arranged equally on the application side and on the side oriented away therefrom.

The alternative solution according to the invention provides that in the unbraked position the brake discs are pressed individually by axially acting return springs against stops which are rotatable with the brake discs but are axially fixed.

In this variant the respective stop is oriented towards the actuation side; that is, the respective return spring presses the brake disc towards the actuation side.

Upon actuation of the brake, the brake discs are brought successively into frictional contact with the non-rotating plates. The first brake disc allocated to the actuation side comes first into contact with the first plate. After the spring force of the return spring of the first disc has been overcome, this disc is displaced until it comes into contact with the second plate. In the same way, the remaining brake discs are brought successively into contact with the associated plates.

This embodiment is especially advantageous in brakes which have only two brake discs, such a multi-disc brake being distinguished by its simple construction, which makes possible very cost-effective manufacture.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a portion of a multi-disc brake according to an embodiment of the invention in a schematic sectional representation; and FIG. 2 shows a detail of the multi-disc brake of FIG. 1 in a longitudinal section view.

DETAILED DESCRIPTION OF THE DRAWINGS

FIG. 1 shows a multi-disc brake, in particular for a road vehicle, comprising plates 4 arranged non-rotatably parallel to and spaced apart from one another. Between each plate 4 is positioned a rotatable brake disc 3, which is fastened in a non-rotatable but axially displaceable manner to a wheel hub 2.

During braking, the radially extending plates 4 and the brake discs 3 are pressed against one another by an application device 6 while overcoming a clearance, and upon release of the brake are separated from one another while forming the clearance.

In one embodiment here, the brake discs 3 in the unbraked position are pressed in a block by axially acting return springs 8 against an axially fixed stop 5, which is fastened to the wheel hub 2 and therefore is rotatable together with the brake discs 3.

In this example, the return springs 8 are arranged in the third and last brake disc 3. The return springs 8 are in the form of helical springs, which are each retained in a respective spring pot 10 which is pressed into the brake disc 3. At the other end the return spring 8 bears against a stepped portion of the wheel hub 2 located opposite the stop 5. The force of this return spring 8 causes the brake discs 3 to abut against the adjacent stud head 15 or, in the case of the first brake disc, against a stop 5, so that the whole pack is pressed as a block against the stop 5 and is held at rest.

In order to compensate an increased clearance caused by wear, pressure elements 7, one of which is represented as a detail in FIG. 2, are arranged in the two other brake discs 3.

In this case the pressure elements 7 have as a casing a spring sleeve 9 which is pressed into bores of the brake discs 3 with a defined frictional engagement.

The radial pretensioning of the spring sleeve 9 against the bore is selected such that a certain predefined displacement force is required in order to displace this spring sleeve 9 in its seating.

A spring pot 10, which receives a compression spring 11 in the form of a helical spring, is retained in the spring sleeve 9. The spring 11 is pretensioned by a stud 12 which has a cylindrical stud head 15 on its end oriented towards the neighboring brake disc 3, while a rivet head 13 is formed integrally on its opposite end, which rivet head 13 bears against a washer 14 which rests against the end face of the spring sleeve 9. In this way, the stud 12 is pretensioned with a predefined force against the spring sleeve 9 by the abutment of its stud head 15.

Between the stud head 15 and the end of the spring sleeve 9 oriented towards it there is established a gap C corresponding to the sum of the reference clearances between the two friction surfaces of a brake disc 3 and the friction surfaces of the associated plates 4.

The pressure elements 7 received in the second brake disc 3 following the application device 6 also have the same pretensioning force as those in the first brake disc 3, that is, in the brake disc oriented towards the application device 6.

The force of the return spring 8 must be smaller by a predefined amount than the pretensioning force of the compression springs 11 in the pressure elements 7. The difference between the force of the pressure elements 7 and the force of the return spring 8 determines the force threshold which must be overcome in order to move the respective brake disc from its rest position away from the pressure elements 7.

In order to actuate the brake, a mechanical application device, for example in the form of a ramp system, as illustrated in FIG. 1, may be provided. However, hydraulic or electromechanical actuation is also possible.

Upon actuation of the application device 6 in the event of braking, the first plate 4 is pressed against the first brake disc 3. When abutment against the friction surface is achieved, the abutment force increases until the opposing spring force of the return spring 8 acting on the last brake disc 3 is overcome. Thereupon, the block consisting of the three brake discs 3, which is pretensioned against the spring stops of the pressure elements 7, is displaced as a whole until the last brake disc 3 (on the left in FIG. 1) rests against the friction surface of the outer plate 4, that is, the plate located remote from the application device 6. As further force is built up, the force threshold of the pressure elements 7 is now also overcome and their compression springs 11 are compressed until all the friction surfaces have come into abutment and the desired application force has built up.

In the event that wear of the friction surfaces has occurred, upon actuation of the brake the stud heads 15 come into contact with the end faces of the spring sleeves 9, so that upon further actuation of the brake the pressure elements 7 are pressed by the resulting tensioning force further into the brake disc 3, the frictional engagement being overcome, until the desired braking force is reached.

In this way, because the pressure elements 7 remain in their new positions after the brake has been released, wear is compensated.

This adjustment already makes possible precise positioning of the pressure elements 7 during first assembly. In this case the pressure elements 7 are initially pressed in with somewhat too much projecting length, so that they are automatically adjusted upon first actuation.

In principle, the pressure elements 7 may also be positioned differently while having the same effect. For example, it is possible to insert the pressure elements 7 of the first brake disc 3—that is, of the brake disc associated with the application device 6—in a mirror-inverted manner in the following, second brake disc 3, the pressure faces of the stud heads 15 pressing on the first brake disc 3 with the same effect as was achieved in the arrangement described previously. The second brake disc 3 may therefore receive all the pressure elements 7, the direction of pressure of the pressure elements 7 being advantageously allocated alternately to the brake discs adjacent on either side.

Instead of being mounted on the actuation side, the stop 5 may be mounted in an opposite position, in which it then comes into abutment with the last brake disc 3 oriented away from the application device 6.

In this case the return springs 8 are located on the actuation side and act on the first brake disc with a direction of pressure in the application direction. In this case, however, the stop must include a displaceable spring element.

The positioning and adjustment of the spacing of the non-rotatable plates 4 may also be effected in the above-described manner, although the compression springs 11 to be installed may be dimensioned to be weaker because of the lower stress thereon.

The determination of the spring forces and the pressing-in forces is set forth in an exemplary manner below.

The determination starts from the empirically ascertained characteristic value of the required stop retaining force for brake discs of the size of commercial vehicle brake discs, which is determined as approximately 100 N/kg for gray cast iron discs weighing approximately 25 kg.

The following terms are adopted.

| Term | Abbreviation |
|---|---|
| Specific retaining force | $F_{Aspez}$ |
| Restoring force (sum) | $F_R$ |
| Force of pressure element springs (sum) | $F_D$ |
| Force threshold of compression springs | $\Delta F_D = F_D - F_R$ |
| Pressing-in force of spring sleeve (sum) | $F_H$ |
| Force threshold of spring sleeves | $\Delta F_H = F_H - F_D$ |
| Mass of brake disc | $m_{is}$ |
| Number of brake discs | i |

The following applies:

$$F_R + \Delta F_D \leq F_D \leq F_H - \Delta F_H$$

Therefore, $F_D$ must be greater than the total restoring force $F_R$ by the predefined force threshold $\Delta F_D$ and becomes less than the pressing-in force (sum) $F_H$ by the force threshold $\Delta F_H$.

For i=3 and $m_{is}$=5.5 kg (aluminum), the following are yielded:

a) Force of return springs 8:

$$F_R = F_{Aspez} \cdot m_{is} = 100 \cdot \frac{N}{kg} \cdot 3 \cdot 5.5 \cdot kg = 1650 \cdot N$$

b) Force threshold $\Delta F_D$:

$$\Delta F_D = F_{Aspez} \cdot m_{is} = 100 \cdot \frac{N}{kg} \cdot 5.5 \cdot kg = 550 \cdot N$$

c) Force of compression spring 11:

$$F_D = F_R + \Delta F_D = 1650 \cdot N + 550 \cdot N = 2200 \cdot N$$

d) Pressing-in force of spring sleeves 9:

$$F_H = F_D + \Delta F_H = 2 \cdot F_D = 4400 \cdot N$$

| Table of Reference Numerals | |
|---|---|
| 1 | Brake housing |
| 2 | Wheel hub |
| 3 | Brake disc |
| 4 | Plate |
| 5 | Stop |
| 6 | Application device |
| 7 | Pressure element |
| 8 | Return spring |
| 9 | Spring sleeve |
| 10 | Spring pot |
| 11 | Compression spring |
| 12 | Stud |
| 13 | Rivet head |
| 14 | Washer |
| 15 | Stud head |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A multi-disc brake for a road vehicle, comprising:
   plates arranged non-rotatably parallel to and spaced apart from one another;
   rotatable brake discs, each one of said rotatable brake discs being positioned respectively between adjacent ones of said plates, wherein the plates and the brake discs are pressable against one another while overcoming a clearance during braking and are separable from one another while forming a clearance upon release of the braking;
   axially acting return springs;
   an axially fixed stop rotatable with the brake discs; and
   one or more resilient pressure elements, at least one of which is provided for a respective one of the brake discs,
   wherein in an unbraked position, the brake discs are pressed at least one of individually and as a block via the axially acting return springs against the axially fixed stop, and
   wherein each pressure element is retained axially displaceably with a defined frictional engagement in the respective brake disc.

2. The multi-disc brake according to claim 1, wherein each pressure element comprises a spring sleeve pressed into a bore of the brake disc in a resiliently radially deformable manner.

3. The multi-disc brake according to claim 2, wherein the spring sleeve has retained therein a spring pot in which a compression spring is arranged.

4. The multi-disc brake according to claim 3, wherein:
   the compression spring bears at one end against a base of the spring pot and at the other end against a stud head of a stud, the stud passing centrally through the compression spring; and
   wherein the compression spring is a helical spring.

5. The multi-disc brake according to claim 4, wherein on an end of the stud oriented away from the stud head, a rivet head is integrally formed thereon, the rivet head bearing via a washer against an associated end face of the spring sleeve.

6. The multi-disc brake according to claim 5, wherein a gap corresponding to a sum of reference clearances on both sides of the brake disc is formed between the stud head and the associated end face of the spring sleeve.

7. The multi-disc brake according to claim 1, wherein a last of the brake discs, which is located remotely from a brake application device for the multi-disc brake, is pressable opposite an application direction of the brake application device.

8. The multi-disc brake according to claim 1, wherein each axially acting return spring is retained in a spring pot and bears at one end against a base of the spring pot and at the other end against a stepped portion of a wheel hub on which the brake discs are arranged.

9. The multi-disc brake according to claim 1, wherein a spring force of the axially acting return spring is less by a predetermined amount than a pretensioning force of the pressure elements.

10. The multi-disc brake according to claim 1, wherein the axially acting return springs are helical springs.

11. The multi-disc brake according to claim 1, wherein the pressure elements are arranged in at least some of the plates.

12. The multi-disc brake according to claim 1, wherein each of the brake discs is provided with an axially acting return spring, the axially acting return spring pressing the brake disc axially against the stop connected rigidly to the wheel hub, the axial pressing being opposite to an application direction.

13. The multi-disc brake according to claim 1, wherein:
- a respective brake disc oriented adjacent the application device is displaceable in the application direction via the return spring; and
- wherein a sequentially last brake disc away from the one brake disc abuts against the stop of the wheel hub.

14. The multi-disc brake according to claim 1, wherein a displaceable pressure element is arranged in the stop.

* * * * *